US005389060A

United States Patent [19]

Huo-Mu

[11] Patent Number: 5,389,060

[45] Date of Patent: Feb. 14, 1995

[54] NOTCHING MACHINE FOR CARDBOARDS

[75] Inventor: Wu Huo-Mu, San Chuong, Taiwan, Prov. of China

[73] Assignee: Guan Tai Machinery Co., Ltd., Taipei Hsien, Taiwan, Prov. of China

[21] Appl. No.: 993,833

[22] Filed: Dec. 21, 1992

[51] Int. Cl.[6] .......................... B31B 1/20; B31B 3/25; B23C 3/30

[52] U.S. Cl. .................................... 493/370; 493/475; 409/157; 409/172; 144/136 R; 144/247

[58] Field of Search ........................ 493/369, 370, 475; 409/157, 172, 173; 144/136 R, 246 R, 247

[56] References Cited

U.S. PATENT DOCUMENTS

| | | | |
|---|---|---|---|
| 1,011,265 | 12/1911 | Summey | 409/157 |
| 1,460,780 | 7/1923 | Ashley | 144/136 E |
| 2,036,411 | 4/1936 | Hathaway | 144/247 |
| 2,327,531 | 8/1943 | Koch | 409/157 |
| 2,829,683 | 4/1955 | Skinner et al. | 144/247 |
| 3,074,327 | 1/1963 | Grahn | 493/362 |
| 3,322,171 | 5/1967 | Cornell | 144/136 R |
| 3,865,161 | 2/1975 | Vizziello et al. | 144/136 R |
| 3,910,170 | 10/1975 | Boy | 144/136 R |
| 3,994,326 | 11/1976 | Sarten | 144/136 R |
| 4,083,390 | 4/1978 | Ingham | 144/136 R |
| 4,342,349 | 8/1983 | Lipman | 144/371 |
| 4,708,708 | 11/1987 | Fries | 493/357 |
| 4,816,015 | 3/1989 | Holder et al. | 493/355 |
| 4,840,207 | 6/1989 | Lines | 144/41 |

FOREIGN PATENT DOCUMENTS

| | | | |
|---|---|---|---|
| 0823016 | 4/1981 | U.S.S.R. | 409/172 |

*Primary Examiner*—William E. Terrell

*Attorney, Agent, or Firm*—Morton J. Rosenberg; David I. Klein

[57] ABSTRACT

The present invention relates to a cardboard notching machine which mainly consists of a body, a transmission group, a roller group, an adjustment group, and a forming group. The roller group is driven by the transmission group so as to feed in cardboards for notching and the forming group has forming cutters for notching cardboards, allowing the notching of cardboard to be performed and completed in one step on the notching machine according to the present invention. Due to the adjustment of gaps between the rollers of the roller group by means of the adjustment group, the forming cutters form notches in a vibrating manner which gives the notches more accurate depth and more smooth surfaces.

1 Claim, 9 Drawing Sheets

NOTCHING MACHINE FOR CARDBOARDS

BACKGROUND OF THE INVENTION

When making and binding general stamp albums and/or document binders, such as those shown in FIG. 7, it usually requires to form notches or grooves 7 on the thick cardboards used to make the albums and/or binders first, as shown in FIG. 8, so as to facilitate the folding and binding before an album, a book case, or a binder is formed. Normally, the notching or grooving of cardboards is done with notching or grooving machines. FIG. 11 illustrates an example of conventional cardboard notching machines wherein a motor 6 is used to drive the machine and a transmission belt 61 is used to feed in the cardboards, furthermore, a roller 62 is used to adjust the tension of belt 61. As shown in FIG. 12, inside each of such conventional cardboard notching machines, there are several sets of parallelly and symmetrically arranged forming tools 64 above the machine table 63, depending on the number of notching positions required and predetermined. When such a conventional notching machine is operated to do cardboards notching, the cardboards must be pre-pressed on a marking press in advance to form notch marks to facilitate the notching by forming tools 64 later. To do the notching, feed in a marked cardboard into the notching machine as shown in FIG. 12. When the cardboard is fed to the right forming tool 64, it is first notched to form deeper marks; when the cardboard further moves to the left forming tool 64, it is then grooved to form the notches with desired depth.

The drawbacks of such notching machine include:

1. A pre-marking of notch is first required on another marking press, i.e., a two-step process is required to complete the notching; and 2. The notched depth is not easily under control, because the forming tools 64 are fixedly mounted on the machine table 63 and the cardboards are fed with transmission belt 61 and are chiselled by the forming tools 64 while they pass through the same. The notches so obtained usually have rough surface and burs and therefore have reverse influences on the appearance of finished products of albums or binders.

It is therefore tried by the inventor to positively develop a notching machine for cardboards to eliminate the drawbacks existed in the conventional notching machines.

SUMMARY OF THE INVENTION

It is a primary object of the present invention to provide a notching machine for cardboards which may perform all the necessary operations of notch forming in one complete step.

A further object of the present invention is to provide a notching machine for cardboards which may form on cardboards more accurate, smooth, and complete notches to enhance the convenience and economic effectiveness of the notching machine and the appearance and quality of finished products.

BRIEF DESCRIPTION OF THE DRAWINGS

The structural design of the present invention and the technical means used to implement such design as well as other objects thereof may be best understood through the following detailed description of the preferred embodiments and the accompanying drawings wherein.

DETAILED DESCRIPTION OF THE PREFERRED EMBODIMENTS

Figure 1:
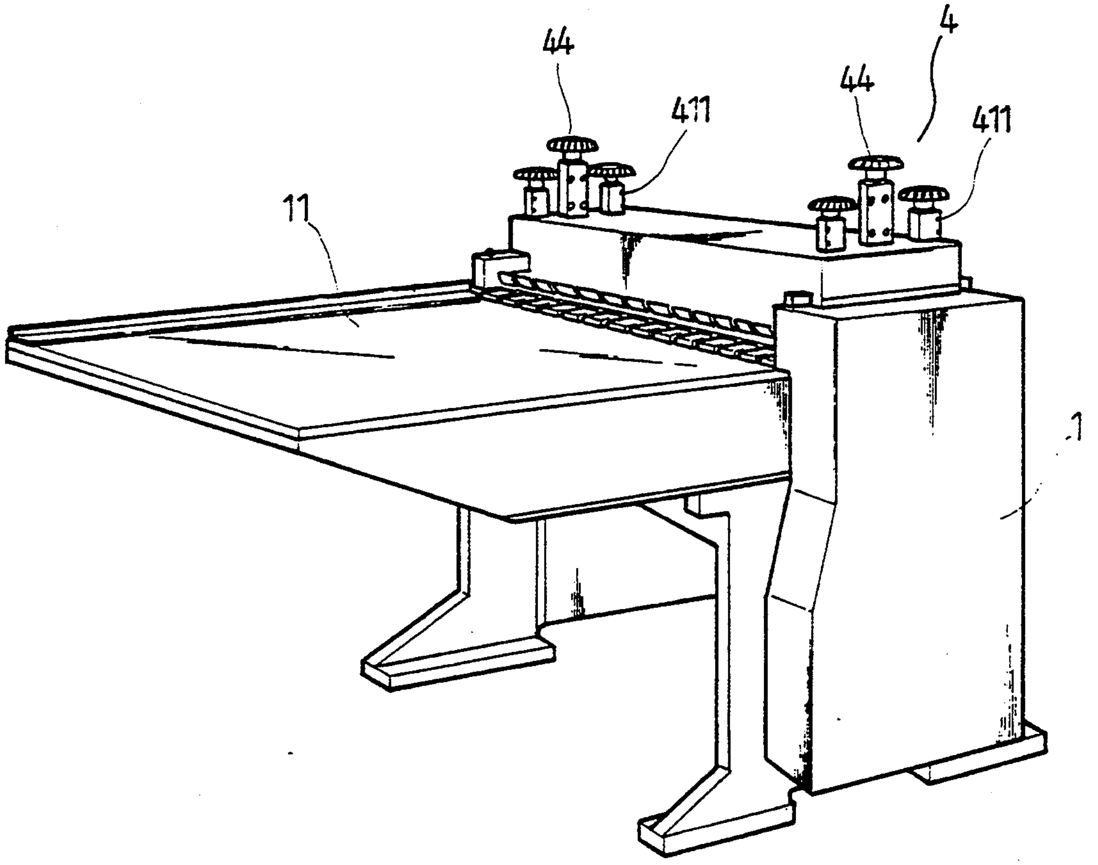
FIG. 1 is a three-dimensional perspective of the notching machine according to the present invention.

The present invention relates to a notching machine for cardboards the appearance of which is shown in FIG. 1. Please refer to FIGS. 2 and 3, the present invention mainly includes a body 1, a transmission group 2, a roller group 3, an adjustment group 4, and a forming group 5.

The body 1 is mainly for mounting the transmission group 2, roller group 3, adjustment group 4, and forming group 5. A worktable 11 is provided at front side of the body 1 for stacking cardboards to be fed and notched later; two generally n-shaped frames 12 are separately provided on top of each lateral side of the body 1 at proper positions.

Figure 2:
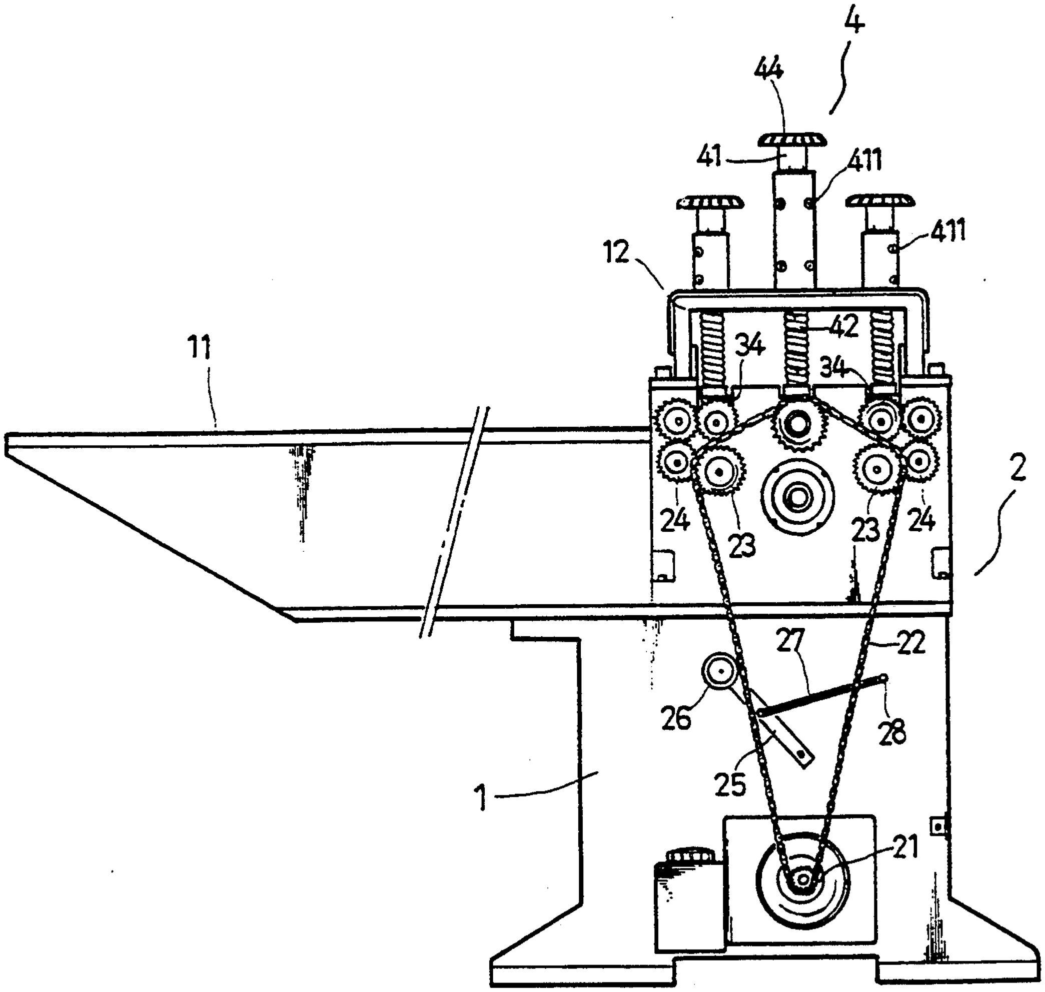
FIG. 2 is a side view of the present invention showing the manner in which the transmission group thereof operates.
Figure 3:
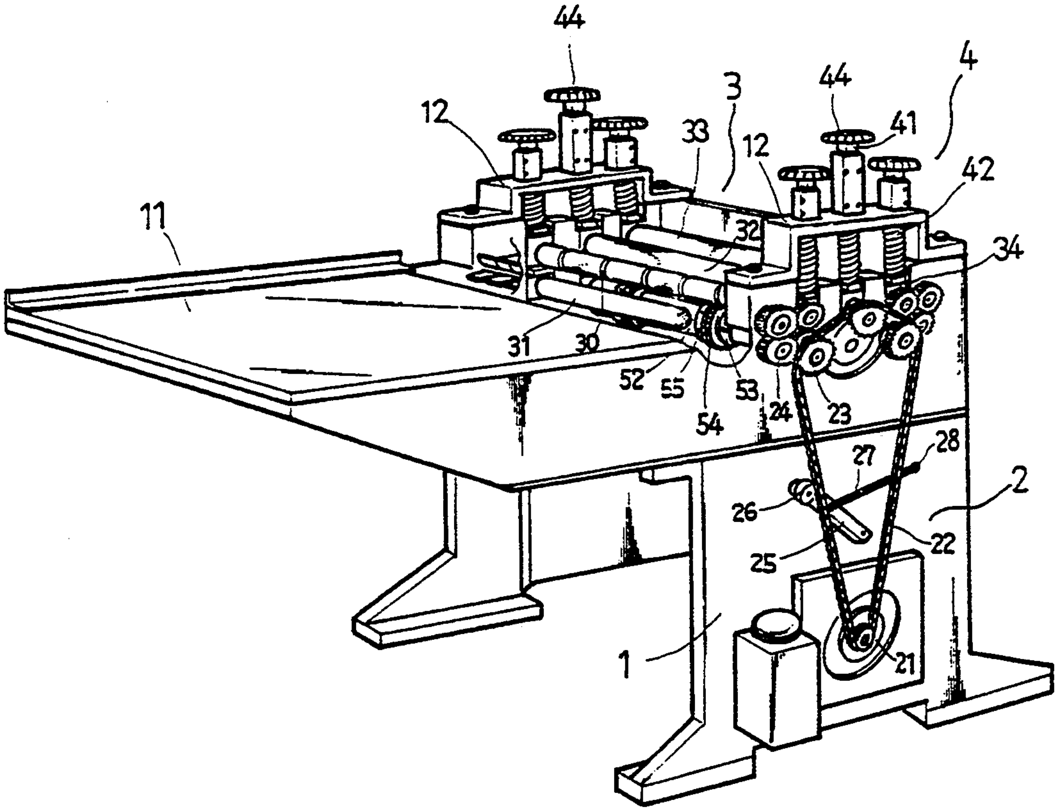
FIG. 3 is another side view showing the roller group of the present invention relative to the transmission group thereof.

The transmission group 2 is mounted at one lateral side of the body 1 as shown in FIG. 2 and is driven by first motor 21 disposed at bottom of the same side of the body 1; a chain 22 is used to gear sprockets 23 which drive a plurality of transmission gears 24, causing the feeding roller group 3 connected with the transmission gears 24 to turn and thereby feed in the cardboard for notching, as shown in FIG. 3. To adequately adjust the tension of the chain 22, a linkage 25 is further mounted on the same side wall of the body 1 with its one end connected to an idler sprocket 26 engageable with the chain 22 and a proper position thereof connected to a first spring 27 the other end of which is fixed to a fixing pin 28 mounted on the same side wall of the body 1.

Figure 4:
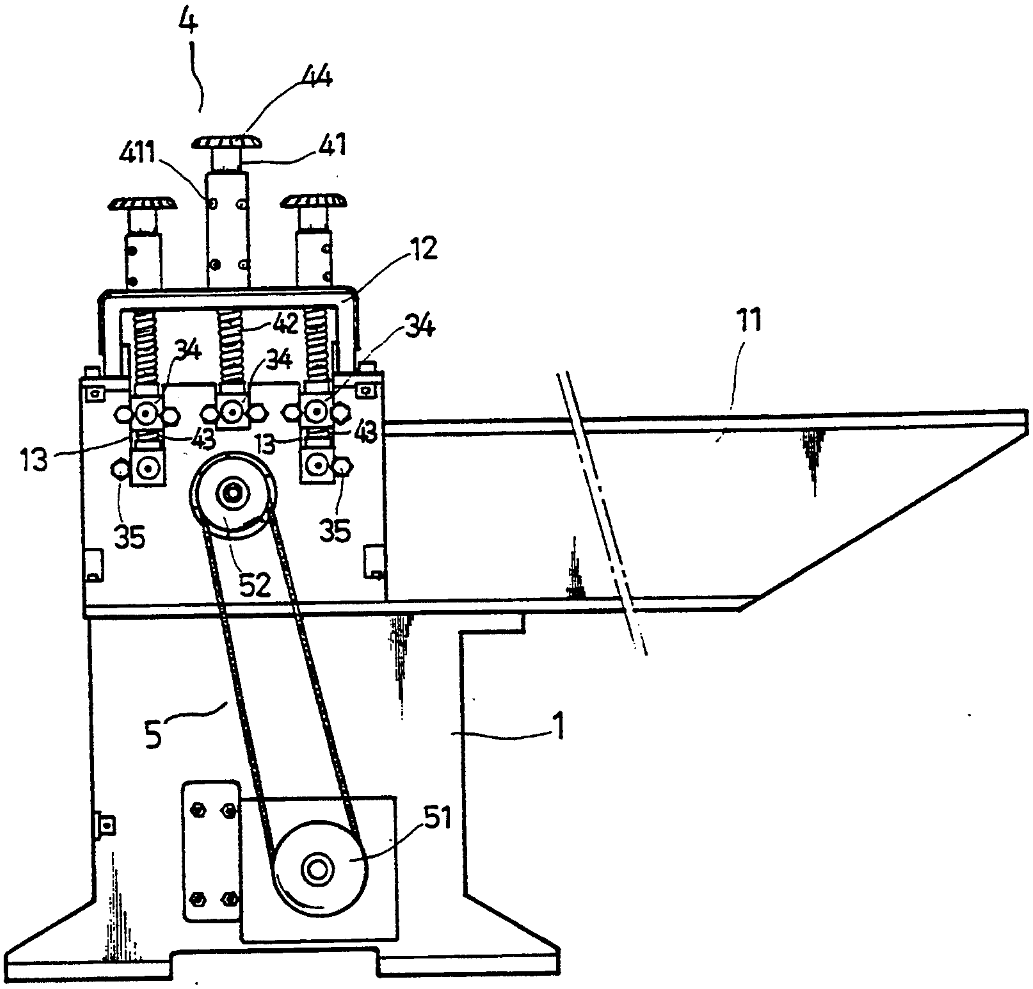
FIG. 4 is a side view of the present invention showing the manner in which the forming group thereof operates.

The roller group 3 is mounted on middle portion of the body 1, as shown in FIG. 3, and includes a set of front feeding rollers 31, an auxiliary roller 32, and a set of rear feeding rollers 33. Both the front and the rear feeding roller sets 31, 33 consist of two vertically and symmetrically arranged rollers. The gap between two rollers of the same set just allows a sheet of cardboard to pass through. The upper roller of the front feeding roller set 31 has a plurality of indents 30 on its surface to secure the fed cardboard at correct feeding position without shifting following the rotation of the rollers. In the roller group 3, each roller is positioned in recesses 13 formed on sidewalls of the body 1 and is fixed therein at two ends by supports 34 and bolts 35, as shown in FIG. 4. The supports 34 can be adjusted at any time through the adjustment group 4.

The adjustment group 4 is mounted on top of the body 1 at proper positions of two lateral sides and is used to adjust the gaps between the rollers of the roller group 3, that is, the gap between each set of rollers can be varied and adjusted with the change in thickness of cardboard to be fed. The adjustment group 4 consists of a plurality of adjusting rods 41 each of which extends through and projects out of the n-shaped frames 12 provided on top of the body 1, as shown in FIGS. 2, 4. The bottom end of each adjusting rod 41 separately connects to the roller supports 34 for the upper rollers of the front and the rear feeding roller sets 31, 33 and for the auxiliary roller 32. A second spring 42 is disposed on each of the adjusting rods 41 between the n-shaped frame 12 and the support 34. Third springs 43 are further separately disposed between the supports 34 for the upper and the lower rollers of the front and the rear feeding roller sets 31, 33. By turning a scaled adjusting screw 44 on top of each adjusting rods 41, the gaps between the upper and the lower rollers of the front and the rear feeding roller sets 31, 33 can be adequately adjusted. When the desired gaps are found and adjusted through turning the adjusting screws 44, fixing bolts 411 are used to fix the adjusting rods 41 lest they should shift under the action of springs 42, 43. The central adjusting rods 41 are mainly used to adjust the auxiliary rollers 32 to obtain desired remaining thickness after the cardboard is notched, that is, to adjust the notch depth formed by the auxiliary rollers 32 and the forming group 5.

Figure 6:
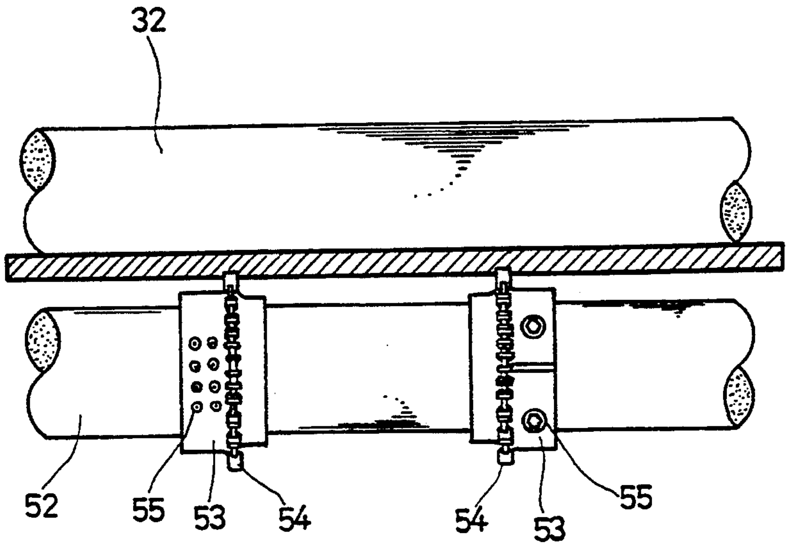
FIG. 6 is a partial front view of FIG. 5.

The forming group 5 is operated by using second motor 51 disposed on another side of the body 1 opposite to the transmission group 2 side to drive a forming roller 52, as shown in FIG. 4. The forming roller 52 locates just below the auxiliary roller 32, as shown in FIG. 3, and is provided with a plurality of annular cutter holders 53 on its surface at proper positions. Each of the cutter holders 53 has a plurality sets of circumferentially disposed forming cutters 54. The number of sets of cutter holders 53 depends on the number of notches to be formed on the cardboards, as shown in FIG. 6. The forming cutters 54 may be freely added to or removed from the cutter holders 53, depending on the thickness of cardboard required by the product design. The cutter holders 53 are firmly fastened to the forming roller 52 with bolts 55 but can be adjusted to move to desired positions to facilitate the notching on cardboards.

Figure 5:
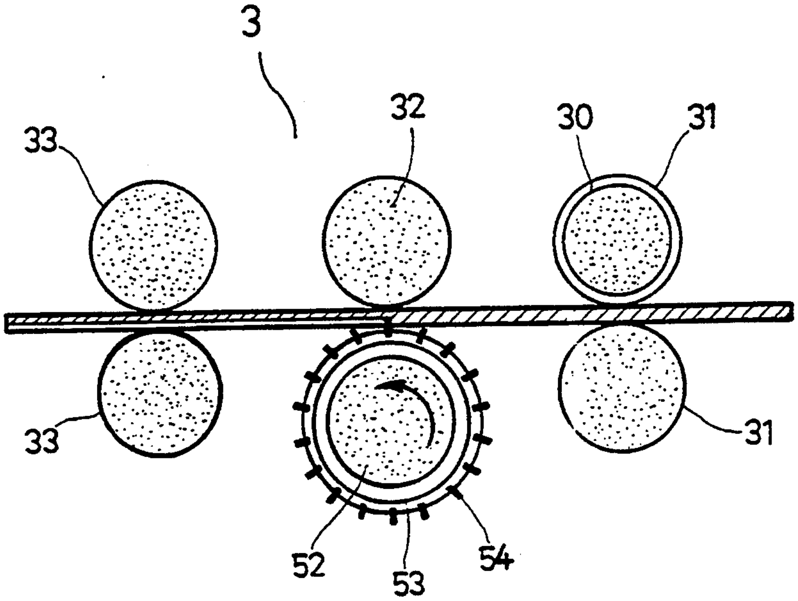
FIG. 5 is a side vertical sectional view showing an embodiment of the manner in which a cardboard is fed into the notching machine according to the present invention.
Figure 7:
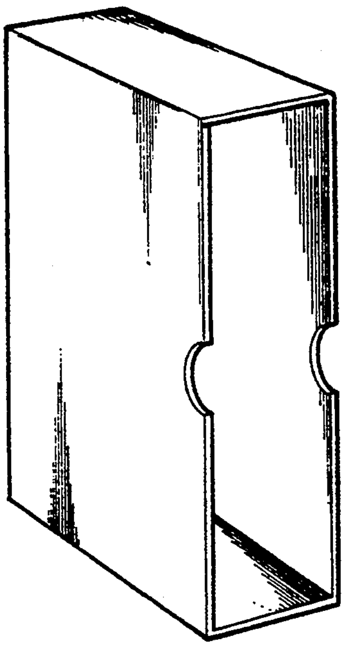
FIG. 7 shows the appearance of a general book or album case.
Figure 8:
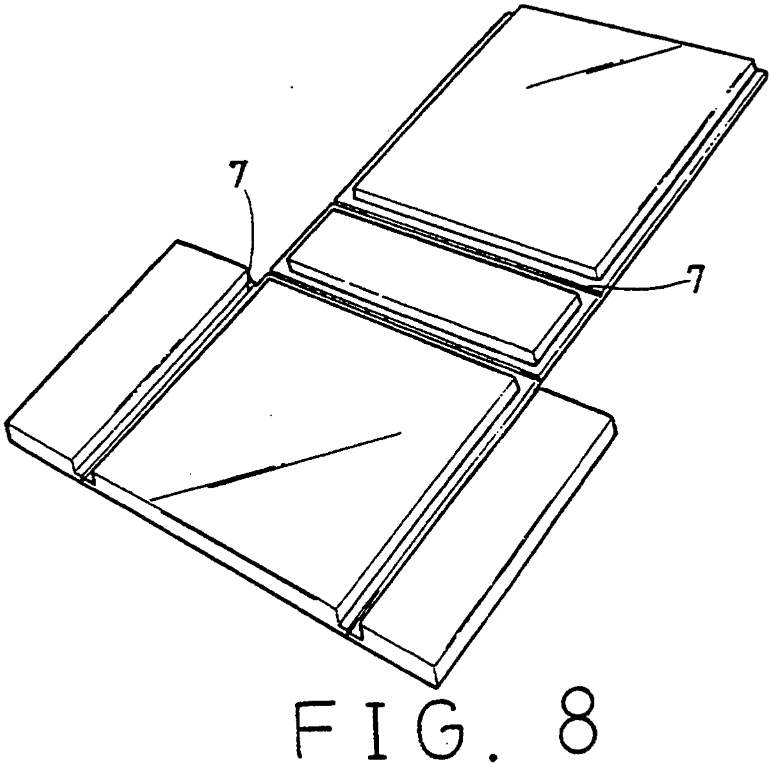
FIG. 8 shows an example of notched cardboards for making a general book or album case as shown in FIG. 7.

With the above-described construction of the main members of the present invention, the transmission group 2 drives the roller group 3 to feed in cardboards for notching. When cardboards pass through the forming cutters 54 on the forming group 5 as shown in FIGS. 5, 6, they are processed and become the notched finished products as shown in FIG. 8, which are suitable for folding into a binder or album case as shown in FIG. 7.

The most significant advantage of the present invention is that the notching of cardboards can be completed in one step on the notching machine according to the present invention by using the front rollers of the roller group 3 to feed in the cardboards, and the auxiliary roller 32 together with the forming cutters 54 on forming rollers 52 to notch the cardboards. Furthermore, according to the manners in which the feeding rollers feeds in cardboard is and the forming roller 52 turns and notches the cardboards, it can be found that the forming roller 52 rotates counterclockwise which allows the forming cutters 54 to proceed notch in a counter-clockwise direction, too. That is, the cardboards are fed in the same direction as that of cardboard fibers, and the notches so formed on the cardboards can be therefore, more accurate in depth. In addition, the surface of notches is more smooth and complete without bur or dents which allows the notched cardboards, after being folded and bound, to provide finish products with better and integral appearance.

Figure 9:
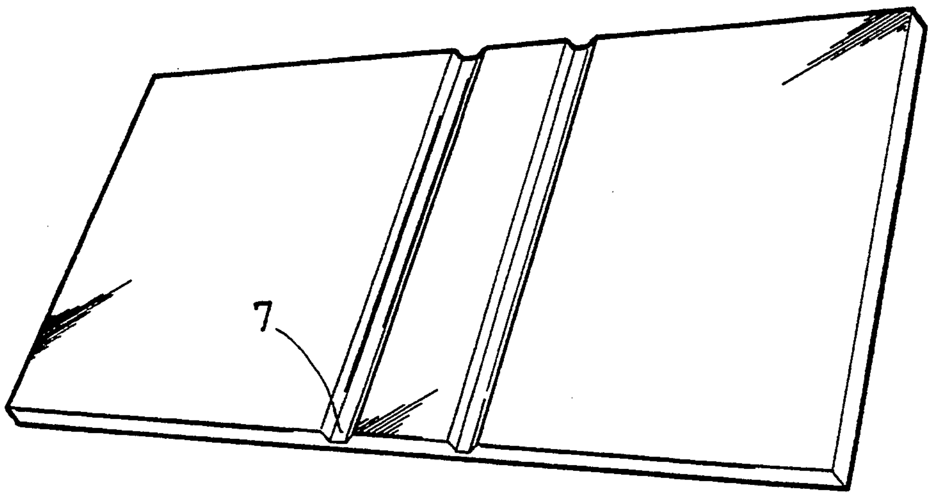
FIG. 9 shows an embodiment of notched cardboard formed by the present invention.
Figure 10:
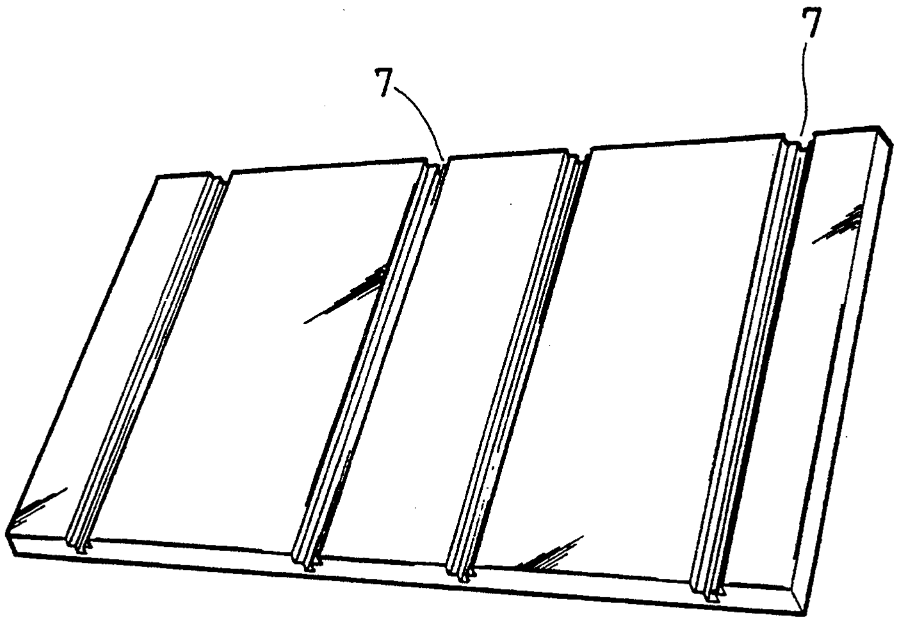
FIG. 10 shows another embodiment of notched cardboard formed by the present invention.
Figure 11:
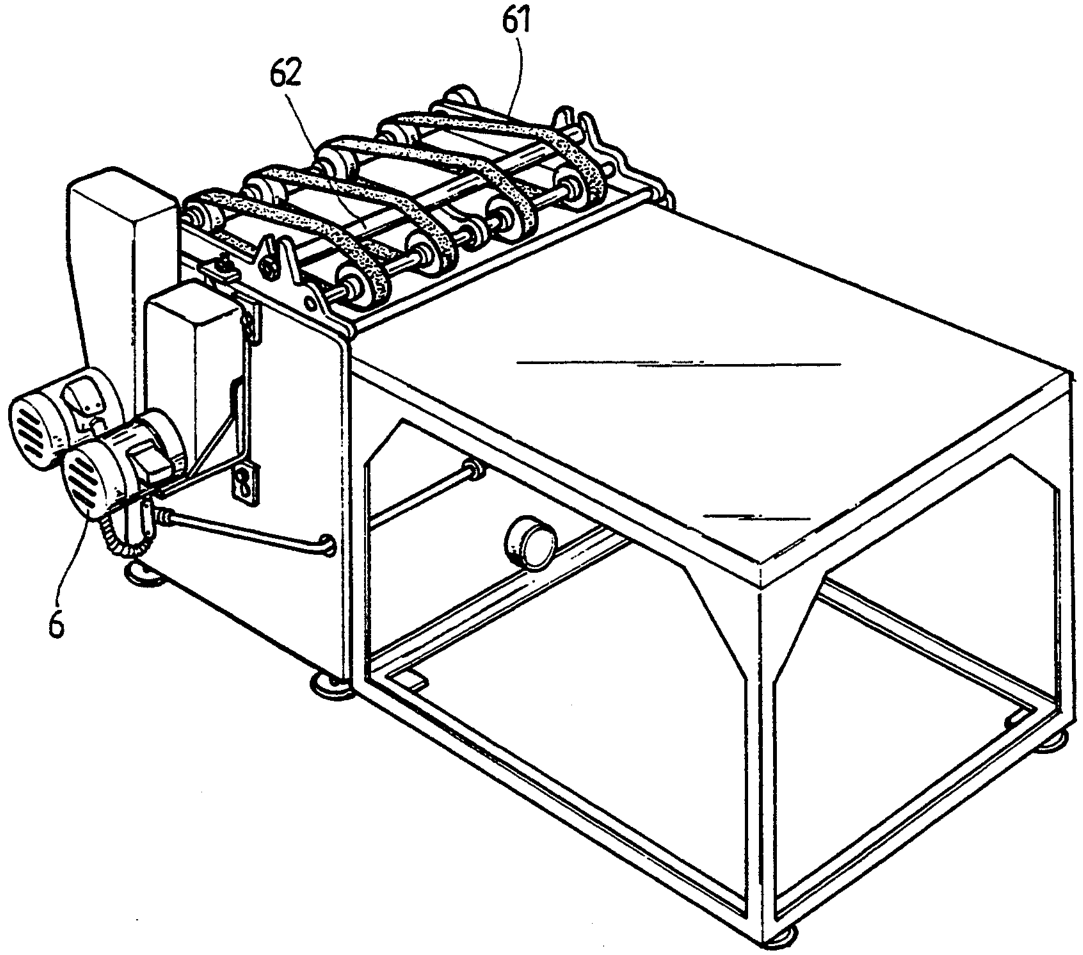
FIG. 11 shows a conventional notching machine.
Figure 12:
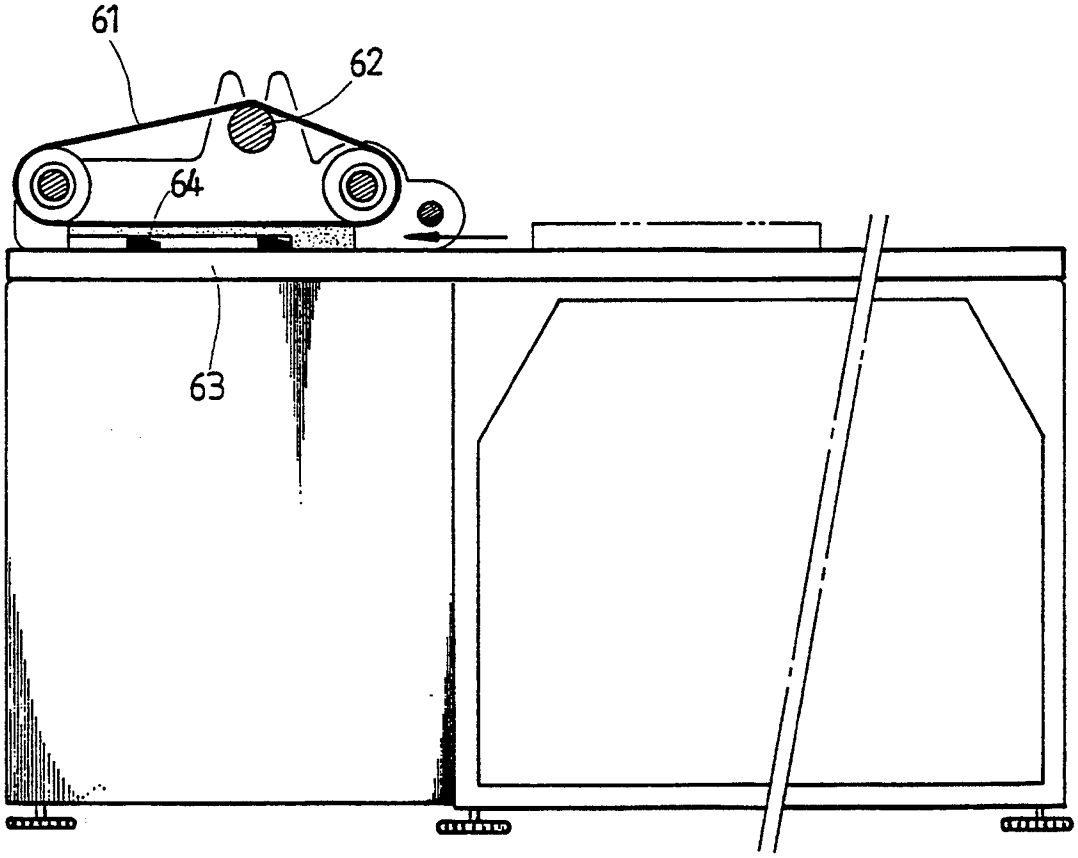
FIG. 12 is a side vertical sectional view of the conventional notching machine shown in FIG. 11.

Moreover, different shapes of notches are also taken into consideration by the present invention. The annular cutter holders 53 are removable for replacement and forming cutters 54 of different cutting edges, such as trapezoid, indented, square, etc., as shown in FIGS. 9, 10 are available for forming notches of different shapes. Multiple cutter holders 53 with forming cutters 54 of different edges can be simultaneously disposed on the forming roller 52, too, to form two or more shapes of notch on one cardboard, if necessary.

According to the above description, the notching machine according to the present invention can conveniently and economically perform the notching of cardboards in one step with more accurate and controlled notch depth which has not been found in any prior art.

What is claimed is:

1. A notching machine for cardboards, comprising a body on which a transmission group, a roller group driven by said transmission group to feed in cardboards, an adjustment group, and a forming group for notching cardboards are mounted, said notching machine being characterized by that:

said roller group is mounted in middle portion of said body and includes a front feeding roller set, an auxiliary roller, and a rear feeding roller set; said front and rear feeding roller sets each consists of an upper and a lower roller being vertically and symmetrically arranged and having a gap therebetween just enough for a predetermined cardboard to pass through; said upper front feeding roller further has dents formed on its sure, ace to secure the positioning of cardboard thereon; two ends of each said rollers of said roller group rest in recesses provided at two sides of said body and are fixed thereto by means of a support and bolts at each end thereof; and said supports are adjustable by means of said adjustment group;

said adjustment group includes a plurality of adjusting rods being separately and properly arranged at two sides of said body with their upper ends extend through and project out of n-shaped frames on top of said body; lower end of said adjusting rods separately connects to said upper roller of said front and said rear feeding roller sets and to said auxiliary roller while a spring is disposed between each of said support and said n-shaped frames; a spring is also disposed between said supports for said upper and said lower rollers of said front and said rear feeding roller sets; each of said adjusting rods has a top adjusting screw for adjusting gaps between said upper and said lower rollers of said front and said rear feeding roller sets; and fixing bolts are used to fix the adjusted adjusting rods; and said forming group consists of a forming roller which is driven by a motor provided at one side of said body; said forming roller locates just below said auxiliary roller and has annular cutter holders thereon, allowing a plurality sets of forming cutter to be circumferentially disposed on said cutter holders; and said cutter holders are position-adjustable and fixable by means of bolts.

* * * * *